United States Patent
Dimeff

[15] 3,679,899

[45] July 25, 1972

[54] NONDISPERSIVE GAS ANALYZING METHOD AND APPARATUS WHEREIN RADIATION IS SERIALLY PASSED THROUGH A REFERENCE AND UNKNOWN GAS

[72] Inventor: John Dimeff, San Jose, Calif.

[73] Assignee: The United States of America as represented by the National Aeronautics and Space Administration

[22] Filed: April 16, 1971

[21] Appl. No.: 134,568

[52] U.S. Cl. ........................................... 250/43.5 R, 356/51
[51] Int. Cl. ..................................... G01n 21/26, G01n 23/12
[58] Field of Search ................................ 250/43.5 R; 356/51

[56] References Cited

UNITED STATES PATENTS 2,951,938  9/1960  Martin ............................. 250/43.5 R Primary Examiner—Ronald L. Wibert
Assistant Examiner—Orville B. Chew, II
Attorney—Darrell G. Brekke, Armand G. Morin, Sr. and John R. Manning

[57] ABSTRACT

A nondispersive gas analyzing means including a first variable volume container for receiving a quantity of a reference gas, a second variable volume container for receiving a quantity of an unknown gas to be analyzed, means for differentially varying the density of the gas in the first and second containers, means for causing radiation to pass serially through the first and second containers, a radiation detector for detecting the intensity of the radiation emerging from the second container and generating a radiation signal responsive thereto, and electronic means for selecting and displaying a particular component of the radiation signal which is uniquely related to the amount of gas of the reference type present in the unknown gas.

13 Claims, 7 Drawing Figures

Fig_1

INVENTOR
JOHN DIMEFF

BY

ATTORNEY

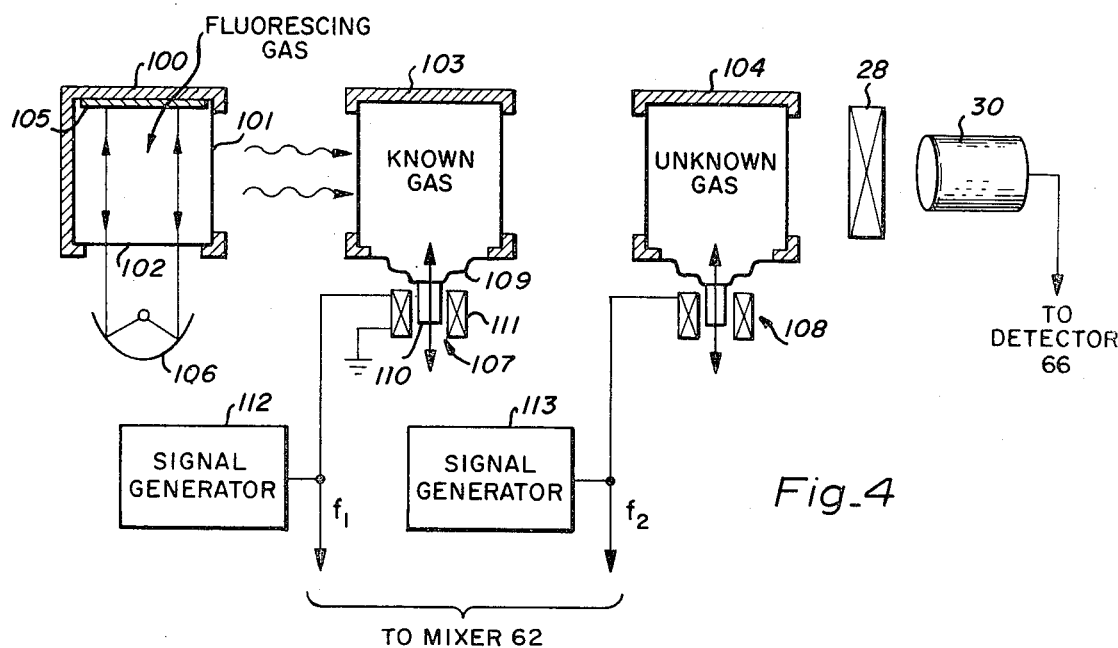
Fig_4
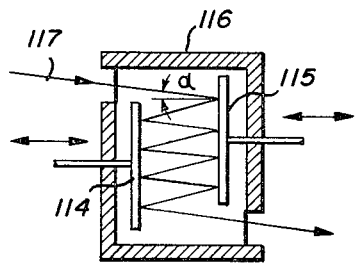
Fig_5
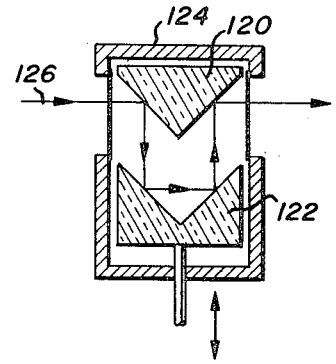
Fig_6
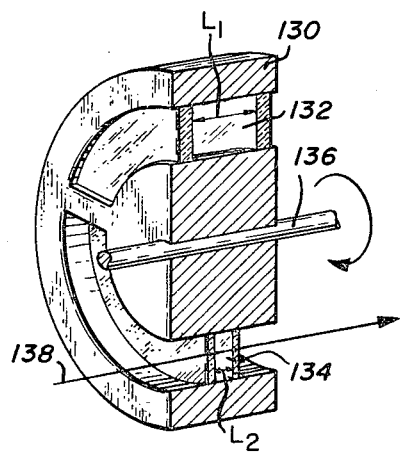
Fig_7

NONDISPERSIVE GAS ANALYZING METHOD AND APPARATUS WHEREIN RADIATION IS SERIALLY PASSED THROUGH A REFERENCE AND UNKNOWN GAS

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to gas analyzing apparatus and more particularly to a novel nondispersive gas analyzing means for analyzing a complex gas sample to determine whether or not it contains particular gas, and further to determine the percentage of that gas contained in the sample.

2. Description of the Prior Art

Although the infrared fluorescence of diatomic and polyatomic gases has become experimentally well established in the last few years, little attempt has been made to exploit this experimental knowledge in the design of practical nondispersive infrared (NDIR) gas analyzers. Existing NDIR gas analyzers, even though simple in structure and capable of high sensitivity, are typically large and heavy and may be subject to serious gas cross-sensitivity effects. Additionally, existing instruments with good gas discrimination usually require the use of pneumatic detectors which may be subject to serious zero drift and microphonic noise problems, and which have a low frequency response. A disclosure of apparatus using nondispersive techniques to analyzer gases along with a discussion of the prior art is found in the U.S. Pat. to Busiguies et al., No. 2,866,900. Another prior art device of this type is disclosed in the U.S. Pat. to Barringer, No. 3,447,876.

OBJECTS OF THE PRESENT INVENTION

A primary object of the present invention is to provide a novel gas analyzing apparatus for determining the presence and quantity of a particular gas in a gaseous mixture using a nondispersive infrared analyzing technique.

Another object of the present invention is to provide a novel nondispersive gas analyzer wherein the density of a reference gas and the density of an unknown gas are modulated in a selected manner as radiation is passed therethrough and then detected so that a mixing of the absorption effects on the radiation passing through each gas produces a particular signal component which is uniquely related to the absorption caused by the reference gas constituent in the unknown gas.

SUMMARY OF THE PRESENT INVENTION

In accordance with the present invention, a novel nondispersive gas analyzer is provided which comprises a first container forming a first chamber for containing a quantity of a known reference gas, including means for modulating the density of that gas at a first selected frequency; a second container forming a second chamber for containing an unknown gas suspected of having the reference gas as a constituent thereof, including means for modulating the density of the unknown gas at a second frequency; a source of radiation for radiating at least one the gases; a radiation detector responsive to the radiation passing through the gases; and means responsive to the modulation frequencies and the output of the radiation detector for selecting certain components of the signals generated thereby, such components being indicative of the quantity of reference gas appearing in the unknown sample.

By periodically modulating the density of the reference gas, the absorption intensities of selectively absorbed bands of incident radiation are also varied periodically since the absorption intensity of the incident radiation in the absorption bands is reduced in exponential proportion to the density of the gas. Accordingly, the intensity of the radiation passing out of the reference gas duplicates each detail of the absorption signature of the reference gas including the fine structure. Similarly, by modulating the density of the unknown gas as the modulated radiation emanating from the first container is passed therethrough, the radiation emanating from the second container and sensed by the detector is also modulated in all of the absorption bands characterizing the unknown gases. Thus, where the same radiation is passed through both containers and where the respective first and second modulation frequencies are different, the radiation detected by the detector will contain time-varying components of both frequencies. Since the absorption process is exponential, and therefore inherently nonlinear, overlapping absorption bands will cause signal mixing giving rise to sum and difference frequencies of the two modulation frequencies, and since these overlapping bands are highly specific to the reference gas, the presence of certain mixed signals indicates the presence of the reference gas in the unknown gas.

An advantage of the present invention is that it provides a technique for arbitrarily and conveniently selecting the particular gas being analyzed. In addition, it provides a technique which minimizes spurious signals introduced by unwanted gases also present in the unknown samples.

Other advantages of the present invention will no doubt become apparent to those skilled in the art after having read the following detailed description of the preferred embodiments which are illustrated in the several figures of the drawings.

In The Drawings:

FIG. 5 is a partial schematic diagram of still another alternative embodiment of the present invention.

FIGS. 5–7 illustrate other alternative methods of varying the number of molecules seen by light rays passing through a quantity of gas.

THOERY OF OPERATION OF THE PRESENT INVENTION

Figure 1:
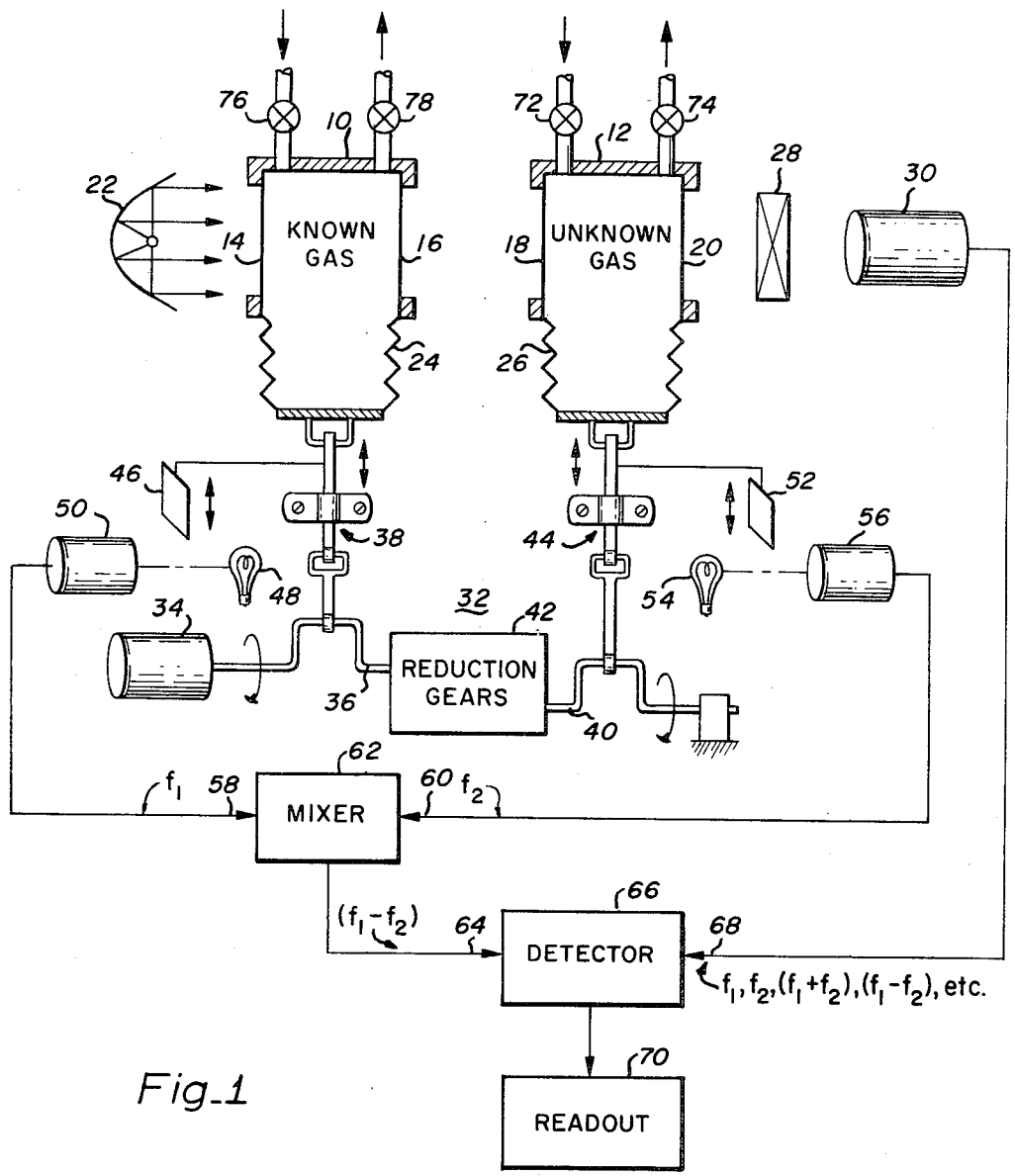
FIG. 1 is a schematic diagram of a simplified embodiment of the present invention.

The present invention can be explained from an analytical standpoint by considering a radiation source of constant output intensity $I_{0\nu}$ shining serially through two variable volume containers with the volume of each being varied in a sinusoidal fashion so as to cause the densities of the gases contained therein to vary sinusoidally. Using the number subscripts 1 and 2 to denote the respective containers, the intensity of the light transmitted through the first container can be expressed as $$I_{1\nu} = I_{0\nu} e^{-K_{1\nu} l_1} \quad (1)$$

where $l_1$ is the length of the first container, and $K_{1\nu}$ is the linear absorption constant. $K_{1\nu}$ may be expressed as $$K_{1\nu} = \sigma_{1\nu}(N_1 + A_1 \sin \omega_1 t) \quad (2)$$

In equation (2), $\sigma_{1\nu}$ is the absorption cross section per molecule at frequency $\nu$, $N_1$ is the time-averaged number of molecules/cm$^3$, $A_1$ is the amplitude (in number density) of density fluctuations, i.e., $A_1 = R_1 N_1$ where $R_1$ is the percent modulation, and $\omega_1$ is the frequency of density fluctuations.

Similarly, the light transmitted through the second container can be expressed as $$I_{2\nu} = I_{1\nu} e^{-K_{2\nu} l_2} \quad (3)$$

where $l_2$ is the length of the second container. As in equation (2), $K_{2\nu}$, the linear absorption constant, can be expressed as $$K_{2\nu} = \sigma_{2\nu}(N_2 + A_2 \sin \omega_2 t) \quad (4)$$

with all symbols defined as above for the first container.

By combining (1) and (3), the intensity of the light transmitted out of the second container can be expressed as $$I_{2\nu} = I_{0\nu} e^{-K_{1\nu} l_1} e^{-K_{2\nu} l_2} \quad (5)$$

and each exponential can be expanded as $$e^{-K_{1\nu} l_1} = 1 - (K_{1\nu} l_1) + \frac{(K_{1\nu} l_1)^2}{2!} - \frac{(K_{1\nu} l_1)^3}{3!} \quad (6)$$

since the value of $(K_{1\nu} l_1)$ and $(K_{2\nu} l_2)$ are taken as much less than one. This is not a requirement in the technique, but simplifies the analysis for pedagogical purposes.

Therefore, $$I_{2\nu} = I_{0\nu} 1 - (K_{1\nu} l_1) - (K_{2\nu} l_2) + \frac{(K_{1\nu} l_1)^2}{2!} + \frac{(K_{2\nu} l_2)^2}{2!}$$

$$+ (K_{1\nu} l_1)(K_{2\nu} l_2) - \frac{(K_{1\nu} l_1)^3}{3!} - \frac{(K_{2\nu} l_2)^3}{3!}$$

$$- \frac{(K_{1\nu} l_1)(K_{2\nu} l_2)^2}{2!} - \frac{(K_{2\nu} l_2)(K_{1\nu} l_1)^2}{2!} \quad (7)$$

Before going into Equation (7) in detail, note that
1. because the expansion is made in terms less than one, higher terms are smaller terms,
2. $(\sin \omega t)^n$ when expanded, results in the frequency $\sin n\omega_1 t$ among others, and
3. $\sin \alpha \sin \beta = \frac{1}{2} \cos(\alpha - \beta) - \frac{1}{2} \cos(\alpha + \beta)$ Terms of the following types can thus be expected with all possible integral values of $m$, $n$, $p$, and $q$:

$$\sin m \omega_1 t \quad (8a)$$

$$\sin n \omega_2 t \quad (8b)$$

$$\sin (p\omega_1 + q\omega_2) t \quad (8c)$$

$$\sin (p\omega_1 - q\omega_2) t \quad (8d)$$

(The distinction between sines and cosines is not kept here since this is only important when the two terms are of the same frequency.) Of course, the terms of highest frequency will be of lowest amplitude.

Returning to Equation (7), the component in $I_{2\nu}$ involving $\omega_1$ will come from the term $(K_{1\nu} l_1)$ such that $$I_{2\nu}(\omega_1) = I_{0\nu}[-\sigma_{1\nu} A_1 l_1 \sin \omega_1 t] \quad (9)$$

and similarly, $$I_{2\nu}(\omega_2) = -I_{0\nu} \sigma_{2\nu} A_2 l_2 \sin \omega_2 t \quad (10)$$

the main difference term can thus be expressed as $$I_{2\nu}(\omega_1 - \omega_2) = I_{0\nu}[1/2 \sigma_{1\nu} \sigma_{2\nu} A_1 A_2 l_1 l_2 \cos(\omega_1 - \omega_2) t] \quad (11)$$

To understand the other difference terms, the term $$-\frac{(K_{1\nu} l_1)(K_{2\nu} l_2)^2}{2!}$$

of Equation (7), which will be abbreviated as $\mathcal{Z}$, must be expanded to give $$\mathcal{Z} = -\mathcal{Z}_0 [N_1 N_2{}^2 + N_2{}^2 A_1 \sin \omega_1 t + 2 N_1 N_2 A_2 \sin \omega_2 t$$

$$+ N_2 (A_1 \sin \omega_1 t)(A_2 \sin \omega_2 t) + N_1 A_2 (\sin \omega_2 t)^2$$

$$+ (A_1 \sin \omega_1 t)(A_2 \sin \omega_2 t)^2] \quad (12)$$

where $$\mathcal{Z}_0 = 1/2 \sigma_{1\nu} (\sigma_{2\nu})^2 l_1 (l_2)^2 \quad (13)$$

The last term in Equation (12) may be expanded to $$\mathcal{Z}_6 = -1/2 \mathcal{Z}_0 A_1 A_2{}^2 \{\sin \omega_1 t - [1/2 \sin(\omega_1 + 2\omega_2) t + 1/2 \sin(\omega_1 - 2\omega_2) t] \} \quad (14)$$

Considering just the last term of Equation (14), the following expression can be developed $$|\mathcal{Z}_6, 3| = 1/8 \sigma_{1\nu} (\sigma_{2\nu})^2 l_1 (l_2)^2 A_1 (A_2)^2 \sin(\omega_1 - 2\omega_2) t \quad (15)$$

and from this equation it can be seen that higher order terms are smaller than earlier terms not only because of the expansion parameters $(\sigma_{1\nu} l_1 A_1)$ and $(\sigma_{2\nu} l_2 A_2)$ which are much less than one, but also as a result of the numerical coefficients resulting from the factorials in the denominators of the exponential expansion terms.

It is possible by proper choice of the frequencies $\omega_1$ and $\omega_2$ to assure that for no values of $q$ or $p$ less than 10 can the quantity $(p\omega_1 - q\omega_2)$ lie within plus or minus 20 percent of the quantity $(\omega_1 - \omega_2)$. For example, with $\omega_1 = 40$ and $\omega_2 = 34$, $(\omega_1 - \omega_2) = 6$. Note that no combination of frequencies up to the tenth harmonic lies between 4.8 and 7.2. Further, note that proper choice of frequency also eliminates problems due to harmonics generated by imperfect sine wave drive of the device, etc.

Since moderate absorptions are dealt with in this analysis, the average transmitted signal can be approximated as the incident signal $I_{0\nu}$ to within a factor of 2, and the AC signal at $(\omega_1 - \omega_2)$, as a fraction of the DC signal, is (from equation 11)

$$\frac{I_{2\nu}}{I_{0\nu}} = 1/2 \sigma_{1\nu} \sigma_{2\nu} A_1 A_2 l_1 l_2 \quad (16)$$

and since $A_1$, $A_2$ are proportional to $N_1$, $N_2$, the solutions are proportional to density. All of these signals must of course be integrated over frequency, $\int d\nu$.

DETAILED DESCRIPTION OF THE PREFERRED EMBODIMENTS

Referring now to FIG. 1 of the drawings, there is shown in a simplified form, a preferred embodiment of the present invention which includes a pair of containers 10 and 12 having walls 14 and 16, and 18 and 20 respectively, which are transparent to radiation emanating from the black body source 22. Each of the containers 10 and 12 also includes flexible walls 24 and 26, respectively, which are in the form of bellows so as to enable the volume of the containers, and thus the density of gases contained therein, to be selectively modified. While this method of modulation can be improved by introducing acoustically resonant volumes or pipes to amplify the effect of motion of those walls and to allow increased operating frequency, the moving bellows will be used to explain the principle of the invention — the alternative embodiments being obvious after the basic invention is understood. Positioned to the right of container 12 is a radiant energy sensing means, such as the photodetector 30, for receiving radiation from source 22 after it has passed through containers 10 and 12. An interference filter 28, which blocks radiation of undesired wavelengths, for example, light outside of the infrared band, is positioned between container 12 and photodetector 30, and/or between the container 10 and the source 22, and/or at other appropriate locations in the apparatus.

In order to selectively vary the volume of containers 10 and 12 and thus modulate the density of the gases contained therein, a suitable drive apparatus such as that shown schematically at 32 may be employed. Drive apparatus 32 includes a motor 34, a crank shaft 36 and a first crank assembly 38 for coupling bellows 24 to crank shaft 36. Shaft 36 also drives a second crank shaft 40 through suitable reduction gears 42. Crank shaft 40 is coupled to bellows 26 through a second crank assembly 44. Affixed to crank assembly 38 is a first blade shutter 46 which, in response to the reciprocal movement of crank assembly 38 periodically blocks light from a lamp 48 from reaching the photocell 50. Similarly, a second blade shutter 52 is affixed to crank assembly 44 so as to periodically block light from a lamp 54 from reaching photocell 56.

The output signals generated by photocells 50 and 56 are, accordingly, frequency related to the modulation frequencies of each container. These signals are fed into the inputs 58 and 60 of an electrical signal mixer 62 which generates an output signal proportional to the difference between the two frequencies. The difference signal is then coupled into a first input 64 of the detector 66. Similarly, the output of photodetector 30 is also coupled into a second input 68 of detector 66. Detector 66 might, for example, be a phase-lock amplifier, a synchronous detector, a cross-correlator or any other suitable electronic device capable of selecting from one input signal a particular signal component which corresponds to another input signal applied thereto, and then generating an output signal corresponding to a particular characteristic of the selected signal component. The output of detector 66 is fed into a suitable readout means 70 which may take the form of a meter, cathode ray tube, recorder, etc.

In operation, a quantity of unknown gas suspected of containing, as a constituent thereof, a particular gas (such as carbon monoxide) is introduced into container 12 through the valved openings 72 and 74, and a quantity of the particular reference gas sought for in the unknown gas is introduced into container 10 through the valved openings 76 and 78. Radiation from black body source 22 is then directed through windows 12, 16, 18 and 20, through interference filter 28, and then onto photodetector 30. However, certain bands of the incident radiation are absorbed by the gases in containers 10 and 12 so that the intensity of the radiation reaching photodetector 30 is a function of the absorption characteristics of the two gases.

As the radiation is passed through the containers, the density of the reference gas in container 10 is varied at a first frequency $f_1$ as motor 34 drives bellows 24, and the density of the unknown gas in container 12 is varied at a second frequency $f_2$ as bellows 26 are similarly driven. The difference in the frequencies $f_1$ and $f_2$ is, of course, obtained through the use of the reduction gears 42. Although a separate motor could be used to drive each of the crank assemblies 38 and 44, the depicted single motor drive version is preferred inasmuch as it eliminates any differential drift that might exist between two drive motors.

As bellows 24 and 26 are driven up and down, their positions are measured by any appropriate measuring technique. In the example shown, blade shutter 46 is periodically interposed between lamp 48 and photocell 50 causing photocell 50 to generate an electrical signal alternating at the frequency $f_1$. Similarly, blade shutter 52 is periodically interposed between lamp 54 and photocell 56 causing photocell 56 to generate an output signal alternating at the frequency $f_2$. The two signals are then beat together in mixer 62 to produce a difference signal $(f_1-f_2)$ which is input to detector 66 for driving it to select a signal component of like frequency from the output of photodetector 30.

Since the densities of the reference and unknown gases are varied at the frequencies $f_1$ and $f_2$, respectively, and the absorption process is exponential and therefore inherently nonlinear, there will, as pointed out above, be signal mixing in the radiation seen by photocell 30. Accordingly, the electrical signals generated by photodetector 30 will have frequencies $f_1$, $f_2$, $(f_1+f_2)$, $(f_1-f_2)$, etc., with the signal component corresponding to the particular gas sought for in the unknown gas being $(f_1-f_2)$. The amplitude of this signal component is directly proportional to the quantity of that constituent contained in the unknown gas. Detector 66, in response to the input on line 64, extracts the component $(f_1-f_2)$ from the many signal components present in the output of photocell 30 and generates an output signal proportional to the amplitude of that component. This output signal is then fed into readout means 70 for display or recording.

Figure 2:
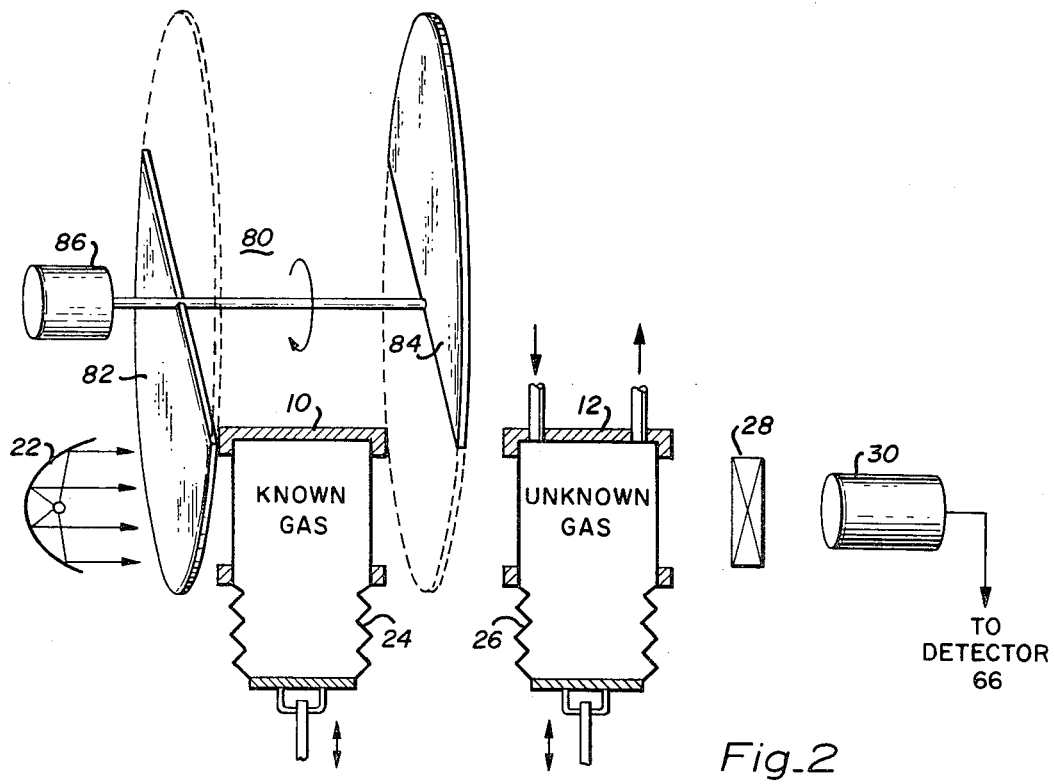
FIG. 2 is a partial schematic diagram of an alternative embodiment of the present invention.

Referring now to FIG. 2 of the drawings, an alternate embodiment of the present invention is illustrated in part. The mechanical drive and electronic components are not repeated since any suitable components functionally equivalent to those shown in FIG. 1 may be used. This embodiment is generally similar to the embodiment illustrated in FIG. 1 except that a light chopping means 80 is provided that includes chopper blades 82 and 84 which are rotated by a motor 86 at a low frequency compared to the gas modulation frequencies. During a portion of its revolution chopper blade 82 blocks and thereby prevents radiation from black body source 22 from entering container 10. However, during the remainder of its revolution, radiation from source 22 is permitted to enter container 10 to excite the reference gas and cause it to fluoresce. The radiation may itself be intense enough to give rise to fluorescence or it may cooperate with the pressure-temperature changes effected by bellows 24 to cause fluorescence.

Chopper blade 84 is complementary to chopper blade 82 and serves to prevent radiation from black body source 22 from passing directly through container 10 and into container 12. Consequently, the radiation which passes into the unknown gas in container 12 is that fluorescent radiation generated by the reference gas as it is caused to fluoresce. By appropriate design of the cavity shape, interior finish, and/or by use of suitable optical elements, the fluorescent radiation induced in the reference gas in container 10 is directed through the unknown sample in container 12, and then into detector 30. In this embodiment, it may be desirable to use a more pronounced cyclic variation in the pressure-temperature of the gas than in the FIG. 1 embodiment to induce the desired level of fluorescence. Since a number of undesirable signals develop in the apparatus whose intensities are proportional to the intensity of the incident light (e.g., scattering from dust particles etc., contained in the gas under test and density modulated along with the gas under test), the substitution of a fluorescent source for the black body (that source being the same type of gas as the gas under test) eliminates all radiation except that radiation which is strongly absorbed by the gas of interest and therefore minimizes the intensity of the undesirable signals compared to the signal of interest.

In passing through container 12, the intensity of the radiation emitted from container 10 is reduced by the presence of even a very small quantity of the reference gas in the unknown sample and the amount of that reduction (by absorption) is thereafter detected as in the previous embodiment and used to provide a direct measure of the amount of reference gas contained in the unknown sample.

Figure 3:
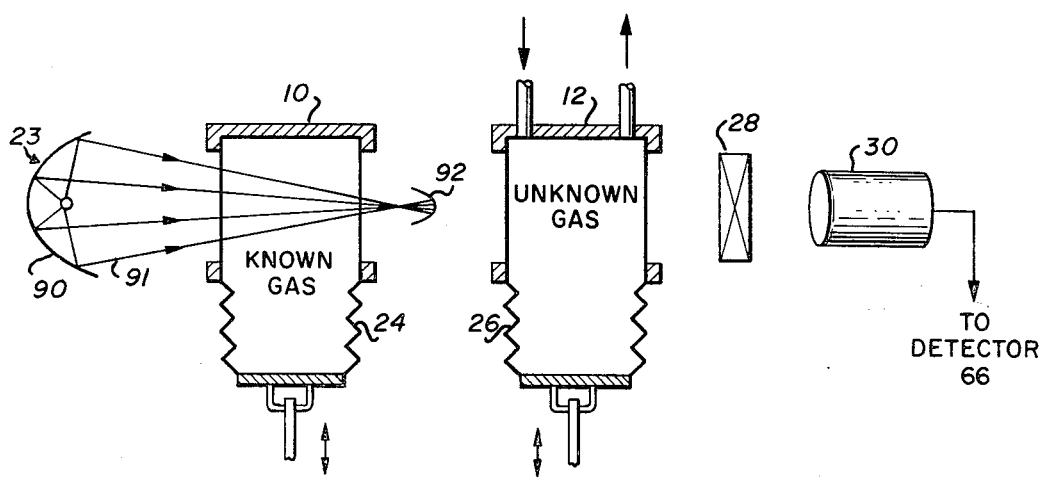
FIG. 3 is a partial schematic diagram of another alternative embodiment of the present invention.

In FIG. 3 of the drawings, still another embodiment of the present invention is shown in part and, as in the previous embodiments, includes a first variable volume container 10 and a second variable volume container 12, along with a black body source of radiation 23, an interference filter 28, a photodetector 30 and mechanical drive and electronic components (not shown) as illustrated in FIG. 1. In this embodiment, however, the mirror 90 of source 23 is designed so as to cause the rays 91 to converge toward a light trap 92 as they pass through container 10. Light trap 92 is positioned between containers 10 and 12, and collects substantially all of the direct radiation from source 23 thereby preventing it from passing through the unknown gas in container 12. In passing through container 10, the radiation, either independently or in cooperation with the cyclic pressure-temperature changes effected by bellows 24, causes the reference gas to fluoresce and only this fluorescent re-radiation is allowed to pass through the unknown gas in container 12 to fall upon photodetector 30. As in the previous embodiments, a particular one of the output signal components generated by photodetector 30 in response to receiving the incident radiation is electronically separated by a detector 66 and used to indicate the presence and quantity of a particular gaseous constituent with the unknown gas.

Still another modification of the present invention is illustrated in FIG. 4 and includes a third gas container 100 having windows 101 and 102 in two adjacent walls instead of in opposite walls as in containers 103 and 104. Disposed within container 100 and on the wall opposite window 102 is a reflector 105 positioned so as to reflect light from black body source 106 back out of the gas containing chamber through window 102. Container 100 is filled with a fluorescing quantity of the known gas (or of some alternative gas having very narrow radiation lines of interest) which when irradiated by source 106 fluoresces to provide a source of well defined radiant energy for passage through the known gas in container 103 and the unknown gas in container 104.

Another modification shown in this embodiment is the use of the electrodynamically driven volume compression devices 107 and 108 forming the lower walls of containers 103 and 104, respectively. As illustrated, devices 107 and 108 may be comprised of a "loud speaker" type structure including a diaphragm 109 driven by the armature 110 of the solenoid 111. Oscillatory energy of a frequency $f_1$ is supplied to device 107 by a signal 112, and oscillatory energy of frequency $f_2$ is supplied to device 108 by a signal generator 113. The densities of the gases contained within containers 103 and 104 are thus modulated at frequencies $f_1$ and $f_2$ respectively, as in the previously described mechanically driven embodiments. The output signals from generators 112 and 113 are also fed into the mixer 62 shown in FIG. 1. It will, of course, be appreciated that any other suitable volume compression device may also be used to periodically increase the density of the gases in containers 103 and 104.

As an alternative to density modulation of the sample and unknown gases, it will be recognized that similar ends can be achieved by varying the path length of the light passing through the respective gases. Such path length variation can be accomplished by positioning displaceable parallel mirrors 114 and 115 in a gas container 116 and directing the incident light rays 117 into container 116 in a direction such that they have an angle of incidence $\alpha$ with mirror 115. Then by causing at least one of the mirrors 114 and 115 to be oscillatorily displaced relative to the other, the length of the path taken by light rays 117 in passing through container 116 will be varied at the oscillatory frequency.

The length L of the path taken by the light rays 117 is $$L = nd/\cos\alpha \quad (17)$$

where $n$, the number of reflections expressed in terms of $l$, the length of mirrors 114 and 115, and $d$, the separation between mirrors 114 and 115, is $$n = l/(d\tan\alpha) \quad (18)$$

For small angles $\alpha$ $$n \approx l/(\alpha d)$$

and $$L \approx l/\alpha$$

Accordingly, by reasoning similar to that above, the intensity $I_1$ of the light (of initial intensity $I_0$) transmitted through chamber 114 may be expressed as $$I_1 = I_0 e^{-\frac{xl}{d\alpha}\left(\frac{\mu\rho d}{x}+1\right)} \quad (19)$$

From this relationship it can thus be noted that the term containing the reflectivity $\rho$ will have an effect approximately equal to that of reflection at densities of about $10^{-4}$ atmospheres and will be dominant when $\rho \approx 10^{-2}$ atmospheres.

Light rays out of the container 116 enter the second container (similar to container 116) at an angle $\beta' = \beta + K\alpha$, where $\beta$ is the nominal angle of entry and $K\alpha$ is the uncompensated fraction of $\alpha$ left in the light rays emergent from the first cell. By inserting $\beta'$ into equation (19) and simplifying the exiting intensity $I_2$ of light emanating from the second container can be expressed as $$I_2 \approx I_1 e^{-\frac{\mu\rho_2 l_2}{\beta'}} \quad (20)$$

The significant factor here is that $\beta'$ already has an $\alpha$ component, thereby introducing a heterodyning which is independent of that introduced by the periodicity in $I_1$ (introduced by $\alpha$). This suggests that at some limiting $\rho_2$, care will have to be exercised in making the light rays emergent from the first cell stable in time by eliminating the effects of the periodic $\alpha$.

The alternative embodiment illustrated in FIG. 6 can be used, however, to introduce a light path length variation without causing any change in the angle of reflection. In this embodiment a pair of 45° mirror devices 120 and 122, at least one of which is displaceable, are mounted within the container 124. By moving mirror 122 up and down in oscillatory fashion, as illustrated, it will be seen that the distance traveled by light rays 126 in passing through container 124 will be changed as in the previous embodiment.

Still another alternative embodiment of the invention, shown in FIG. 7, includes a rotating gas container 130 having a first arcuate shaped gas chamber 132 with an axial light path length $L_1$, and a second arcuate shaped gas chamber 134 with a smaller light path length $L_2$. As container 130 is rotated about its axis 136, the light rays 138 will be modulated at the rotational frequency of container 130 and will have a modulation amplitude proportional to $L_1/L_2$ where the densities of the gases in chambers 132 and 134 are equal. It will be appreciated that the modulation amplitude can be increased or decreased by increasing or decreasing the density of the gas in an appropriate one of the chambers. As in the previous embodiments a second container filled with the unknown gas and positioned adjacent container 130 will also be utilized so that the reference modulated light rays 138 are modulated a second time in passing through the unknown gas container to produce the signal mixing discussed above.

In accordance with further alternative embodiments of the invention, several reference gas samples can be simultaneously introduced into a number of separate sample containers serially situated with respect to the container 10 with each sample being modulated at a different frequency to allow simultaneous identification of several components in the unknown gas. Alternatively, the reference gas can be periodically exchanged for a new reference gas to allow sequential detection of a number of components in the unknown gas. Furthermore, radiation source 22 can be followed by a filter which reduces the spectral width of the source to those general regions of the spectrum where absorption is effected by the gas being analyzed.

As another alternative, a signal in synchronism with the density modulation of the reference gas can be multiplied against the signal derived from photocell 30 to produce a synchronous detection with all of the noise rejection advantages attendant thereunto. Moreover, the signal derived from the above synchronous detection can again be multiplied against a signal which is proportional to the density of the unknown gas, thereby producing a double synchronous detection with all the noise rejection advantages attendant thereunto. A periodic variation in the path length through the reference and unknown gases can also be substituted for the periodic density variations. The transverse position of the light path as it passes through the unknown sample can also be changed periodically (with density and path length being held constant) to provide information on the transverse density gradient of the particular gas and the unknown sample.

Replacement of photocell 30 with a mirror will allow one to place the light generator and detector in the same portion of the apparatus and remote from the chamber 12. Furthermore, measurement of the unabsorbed light reflected from the mirror will allow correction of the signal for variations in mirror reflectivity.

Use of a natural light source (such as the sun) to illuminate a scene in configuration with a density modulation of the reference gas, a changing ray path, and a correction for the natural variation of light intensity (by using the unabsorbed wavelengths as a reference beam for the absorbed wavelengths), will allow the use of the present technique as a method of remotely detecting gases. Although other modifications of the present invention will undoubtedly become apparent to those skilled in the art after having read the above disclosure, it is to be understood that the appended claims are to be interpreted as covering all such embodiments and subsequent modifications which fall within the true spirit and scope of the invention.

What is claimed is:

1. A nondispersive gas analyzing apparatus, comprising:
   means forming a first chamber for containing a reference gas;
   means forming a second chamber for containing an unknown gas;
   radiant energy source means for causing radiant energy to pass serially through said first chamber and said second chamber;

first modulation means for modulating the radiant energy passing through said first chamber at a first frequency;

second modulation means for modulating the radiant energy passing through second chamber at a second frequency;

radiant energy sensing means responsive to the radiant energy passing through said chambers and operative to develop an electrical signal containing a plurality of signal components related to the constituents of said gases; and signal detector means responsive to said electrical signal and operative to select therefrom a particular signal component relating to the presence of a reference gas constituent in said unknown gas.

2. A nondispersive gas analyzing apparatus as recited in claim 1 wherein said first modulation means includes means for periodically varying the volume of said first chamber, and said second modulation means includes means for periodically varying the volume of said second chamber.

3. A nondispersive gas analyzing apparatus as recited in claim 2 wherein said means forming a first chamber includes a bellows portion, and said means for periodically varying the volume of said first chamber includes an oscillatory means for driving said bellows portion at said first frequency.

4. A nondispersive gas analyzing apparatus as recited in claim 1 wherein said first modulation means includes means for periodically varying the density of said reference gas and said second modulation means includes a means for periodically varying the density of said unknown gas.

5. A nondispersive gas analyzing apparatus as recited in claim 4 wherein said means forming said second chamber includes an electrodynamically driven flexible wall member, and said means for periodically varying the density of said unknown gas includes a source of oscillatory electrical energy for driving said wall member at said second frequency.

6. A nondispersive gas analyzing apparatus as recited in claim 1 wherein said first modulation means includes means for varying the length of the path taken by said radiant energy in passing through said reference gas and said second modulation means includes means for varying the length of the path taken by said radiant energy in passing through said unknown gas.

7. A nondispersive gas analyzing apparatus as recited in claim 6 wherein said means for varying the path length taken by said radiant energy in passing through said reference gas includes a first reflective surface disposed at an angle relative to the incident radiant energy, and a second reflective surface disposed parallel to said first reflective surface, whereby said radiant energy is reflected from said first reflective surface to said second reflective surface, and means for periodically moving one of said reflective surfaces relative to the other at said first frequency.

8. A nondispersive gas analyzing apparatus as recited in claim 1 and further comprising chopper means disposed on each side of said first chamber and operative to periodically admit direct radiant energy from said radiant energy source means to enter said first chamber while preventing such direct radiant energy from entering said second chamber.

9. A nondispersive gas analyzing apparatus as recited in claim 1 wherein said radiant energy source means includes means forming a third chamber for containing a known gas, and means for causing said known gas to fluoresce and thereby provide said radiant energy.

10. A nondispersive gas analyzing apparatus as recited in claim 1 wherein said radiant energy source means includes means for causing said reference gas to fluoresce, such fluorescence providing radiant energy for passage through said second chamber.

11. A gas analyzing method comprising the steps of:

providing a quantity of a reference gas and quantity of an unknown gas;

directing radiant energy serially through said reference gas and said unknown gas in such a manner that said radiant energy is at least partially absorbed in passing therethrough;

modulating the absorption of said radiant energy in said reference gas at a second frequency;

modulating the absorption of said radiant energy in said unknown gas at a second frequency;

detecting the modulated radiant energy and developing an electrical signal commensurate therewith, said electrical signal including signal components related to the constituents of said unknown gas; and separating from said electrical signal a signal component representative of the quantity of said reference gas in said unknown gas.

12. A gas analyzing method as recited in claim 11 wherein the modulation of the absorption of said radiant energy in said reference gas is effected by varying the density of said reference gas at said first frequency, and the modulation of said radiant energy and said unknown gas is effected by varying the density of said unknown gas at said second frequency.

13. A gas analyzing method as recited in claim 11 wherein the modulation of the absorption of said radiant energy in said reference gas is effected by periodically varying at said first frequency the length of the path taken by said radiant energy in passing through said reference gas, and the modulation of said radiant energy in said unknown gas is effected by periodically varying at said second frequency the length of the path taken by said radiant energy in passing through said unknown gas.

* * * * *